United States Patent
Hubler

[15] 3,666,276
[45] May 30, 1972

[54] DEVICE FOR THE SEALING OF A ROTATABLE SHAFT

[72] Inventor: Robert Hubler, Paris, France

[73] Assignee: Societe D'Etudes et de Developpement des Industries Modernes (S.E.D.I.M.), Le Plessis Robinson (Hauts de Seine), France

[22] Filed: Dec. 11, 1969

[21] Appl. No.: 884,201

Related U.S. Application Data

[63] Continuation-in-part of Ser. No. 635,470, May 2, 1967, abandoned.

[52] U.S. Cl. .................................. 277/30, 277/53, 308/36.1
[51] Int. Cl. ...................................... F16j 15/16, F16r 41/00
[58] Field of Search .................... 277/8, 30, 53, 97, 98, 174; 308/36.1 AB

[56] References Cited

UNITED STATES PATENTS

| | | | |
|---|---|---|---|
| 2,964,339 | 12/1960 | Macks | 277/35 |
| 3,034,837 | 5/1962 | Barker | 308/9 |
| 3,226,467 | 12/1965 | Kienel et al. | 174/18 |
| 3,337,222 | 8/1967 | Smith et al. | 30/134 |

FOREIGN PATENTS OR APPLICATIONS 889,206  2/1962  Great Britain

*Primary Examiner*—Samuel B. Rothberg
*Attorney*—Michael S. Striker

[57] ABSTRACT

A sealing device affording a moderate leakage for the passage of a rotary shaft extending through the wall of a casing in which the internal fluid pressure differs from the external pressure, this device comprising in combination a tubular socket surrounding said rotary shaft, the inner surface of said socket having a small annular clearance with respect to the outer surface of said rotary shaft, so that these two surfaces provide therebetween an annular passage permitting a limited fluid flow between said casing and the surrounding atmosphere. At least one of the two registering cylindrical surfaces, namely the inner surface of said socket and the outer surface of the corresponding portion of said shaft, is provided with a lining of a material having a low coefficient of friction. A bellows-forming sleeve of flexible material connects said socket to the wall of said casing through which said rotary shaft extends and said socket is restrained against movement in longitudinal direction.

3 Claims, 6 Drawing Figures

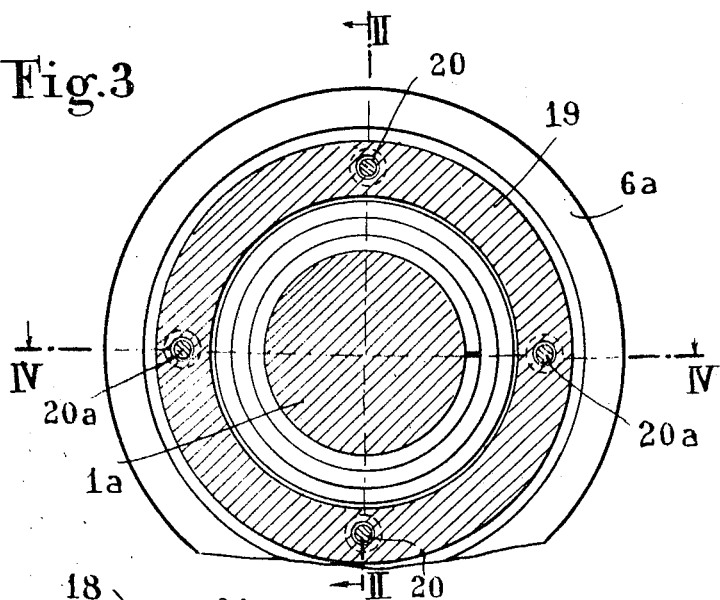
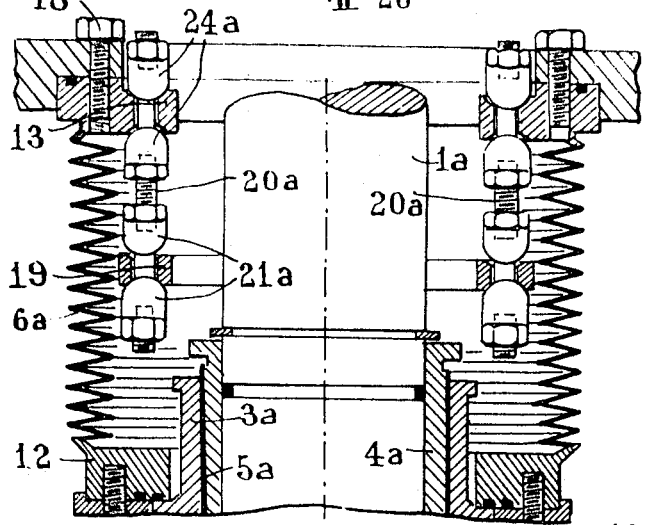
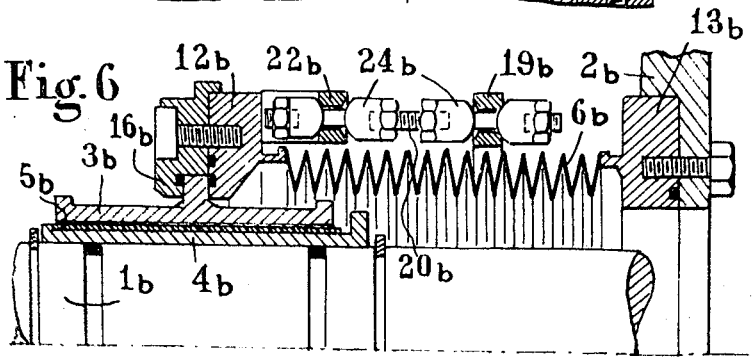
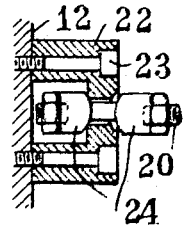

DEVICE FOR THE SEALING OF A ROTATABLE SHAFT

The present application is a continuation-in-part application of my copending application, Ser. No 635,470 filed on May 2, 1967, and now abandoned.

The present invention relates to a moderate-leakage sealing device for a rotatable shaft which, in a machine or any other mechanical device is partially located within and partially without a casing the internal pressure of which differs from the ambient external pressure.

The pressure differential and the moderate leakage permitted by the device may also be such as to constitute a protective barrier in case, for example, the outer ambient atmosphere or the inner atmosphere of the casing contains a noxious gas.

The present device is of the type comprising a relatively long tubular socket surrounding the rotatable shaft with a certain annular clearance so that a fluid bearing may build up about this shaft in order to avoid any direct contact between it and the external socket, by virtue of the flow of fluid produced through said clearance as a consequence of the pressure differential prevailing on either side.

However, this fluid bearing (i.e. a gas bearing in case the fluid is a gas) cannot build up unless the rotatable shaft is driven at a relatively high and sufficient speed. Under these conditions, when the rotary motion of the shaft is started or stopped, there is a risk of seizing or binding of the parts as a consequence of the direct contact taking place between the external socket and the rotatable shaft.

It is therefore the essential object of this invention to provide a sealing device or shaft packings of the type under discussion, but which is so designed that the annular clearance between the rotary shaft and the external socket can be as small as possible in order to limit the leakage of said fluid, without creating any risk of seizing or binding between the external socket and the rotary shaft.

To this end, at least one of the two co-acting surfaces, that is the inner or bearing surface of the external socket and the outer or journal surface of the corresponding shaft portion, is made of a material having a low coefficient of friction, such as tetrafluoroethylene.

Besides, the external socket provided in the device of this invention is mounted so as to have a certain amount of free play in radial direction, and is retained against movement in the axial direction by means adapted to preserve said free play in the radial direction. For the same purpose, the sealing means provided between said socket and the casing through which the rotatable shaft extends, consist of a bellows-like member of flexible material so that said socket can move freely in the radial direction.

The arrangement thus contemplated eliminates any risk of seizing or binding between the socket and the rotary shaft when the latter revolves at a speed below the value necessary for creating a fluid bearing therearound, for example when starting the rotatable shaft from rest and also when the shaft is decelerated before stopping completely.

Under these conditions the clearance provided between the rotary shaft and the external socket can be reduced to a minimum value in order to limit the fluid leakage around the rotary shaft.

A few typical forms of embodiment of the sealing device of this invention will now be described by way of example and with reference to the attached drawings, in which:

FIG. 3 is a cross-section taken on the line III—III of FIG. 2;

FIG. 4 is an axial section taken on the line IV–IV of FIG. 3;

FIG. 5 is a sectional view showing a detail; and

FIG. 6 is a fragmentary axial section showing a modified embodiment of the novel device.

As already explained in the foregoing, the device according to this invention is adapted to be used as a seal or packing for a rotary shaft extending through the wall of a casing in which the pressure is higher or lower than the ambient external pressure.

Figure 1:
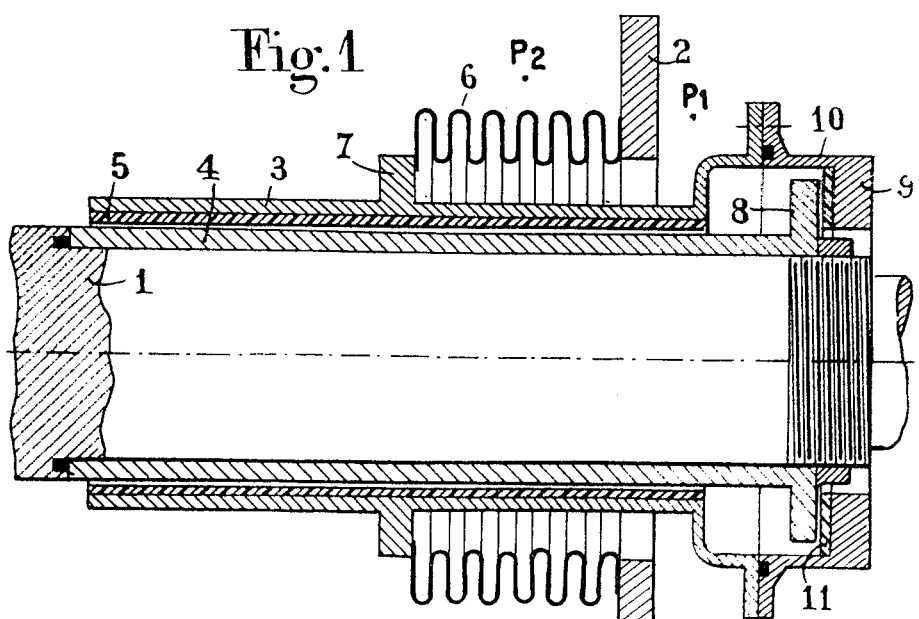
FIG. 1 is an axial section showing a first embodiment of the sealing device of this invention.

In the example illustrated in FIG. 1 the device surrounds a portion of a rotary shaft 1 which extends through the wall 2 of a casing in which the internal pressure P1 is higher that the external pressure P2 of the medium in which said casing is disposed.

Besides, this casing contains an innocuous neutral fluid that can therefore be allowed to be exhausted to the atmosphere surrounding this casing without any inconvenience, as a result of the moderate or limited leakage constituting a characteristic feature of the device of this invention.

On the other hand, this casing 2 may enclose any desired machine or apparatus which is to be placed into an enclosure or medium containing a corrosive, radio-active or dangerous fluid, from the deleterious effects of which the machine or apparatus must be protected. This protection is obtained due to the protective barrier formed by the leakage of the neutral fluid which tends to flow out from the casing 2.

The device of FIG. 1 comprises a relatively long socket or sleeve 3 made from a highly distortion-free material.

On the corresponding or registering portion of shaft 1 a sleeve 4 consisting of the same material as the socket 3, or of a material having characteristics akin thereto, is provided.

The inner surface of socket 3 comprises a tubular lining 5 of a material having a low coefficient of friction, such as tetrafluoroethylene or graphite.

The inner diameter of this lining is such that a reduced annular clearance is left between the socket 3 and the sleeve 4 carried by the rotary shaft.

The socket 3 is secured to the casing wall 2 by means of a bellows-forming member 6 of flexible material. This member 6 may advantageously be made from a suitable metal and has its ends secured in a fluid-tight manner to a collar 7 carried by socket 3 and to the corresponding face of casing 2, respectively. Thus, the member 6 will provide the desired fluid-tightness between the socket 3 and the fixed wall 2 while permitting a certain free play of the socket 3 both radially and axially.

However, retaining means are also provided for restraining the socket 3 against excessive movement in the axial direction, at least in the direction in which it may tend to be moved by the pressure differential between P1 and P2.

In the example illustrated in FIG. 1, these retaining means consist of an abutment system adapted to constitute a so-called "fluid abutment" during the rotation of shaft 1. This abutment system comprises a flange or collar 8 carried by the sleeve 4 surrounding the shaft 1. Registering with this flange 8 is a shoulder 9 carried by an annular member 10 secured to the corresponding end of socket 3.

At least one of the two registering faces of flange 8 and shoulder 9 carries a lining 11 of a material having a low frictional coefficient. Thus, this assembly acts as a hydrodynamic or aerodynamic abutment capable of withstanding the thrust resulting from the pressure differential applied to the movable assembly consisting of socket 3 and member 6. However, it should be noted that this abutment system permits a certain free motion of socket 3 in the radial direction. Now, this free motion is definitely necessary for a proper operation of the sealing device of this invention. In fact, the socket must be allowed to move somewhat in this direction for accommodating the possible distortion of the rotary shaft. It is also necessary that this socket can be slightly raised when starting rotation the rotary shaft, so that a fluid bearing can build up about the shaft.

Of course, the building up of this fluid bearing is permitted by the clearance provided between the socket 3 and rotary shaft 1, and also by the pressure differential between P1 and P2.

The clearance thus provided will allow a limited or moderate fluid leakage to take place, thus permitting the operation of the assembly as a fluid bearing, for example a gas bearing. However, this fluid bearing can build up about the rotary shaft 1 only when the latter revolves at its rated speed, for example 3,000 r.p.m.

In fact, when the shaft 1 is stationary, the socket 3 rests by gravity upon the upper surface of this shaft, and this creates a risk of seizing or binding in devices of the same type when starting from rest. However, in the case of the present device this risk is eliminated by the presence of the layer 5 of material having a low coefficient of friction, which lines or coats the inner surface of socket 3.

Therefore, this layer of material eliminates any risk of seizing or binding when the shaft is started, and also when the shaft decelerates before stopping completely.

Of course, the layer 5 of material having a low frictional coefficient could also be carried by the outer surface of sleeve 4 surrounding the rotary shaft 1, instead of being disposed on the inner surface of socket 3. Still another alternative would consist in providing such a layer of low-friction material both on the outer surface of shaft 1 and on the inner surface of socket 3.

The means for retaining the socket 3 in the longitudinal direction are adapted to become operative when the internal pressure P1 is greater than the external pressure P2. But the arrangement could be different in the event the pressure relationships were reversed. Moreover, a double abutment system of the same type could be provided in case a counter-pressure might develop during the operation of the device.

FIGS. 2 to 5 inclusive illustrate still another embodiment of the invention. In this case the device is also shown as surrounding a rotary shaft 1a where the latter passes through the wall 2a of a casing of which the inner pressure P1 exceeds the outer pressure P2.

As in the preceding case, this casing encloses a neutral fluid adapted to leak to the outside in order to constitute a protective barrier against a corrosive, radio-active or noxious fluid contained in the ambient atmosphere or in an enclosure containing said casing.

This modified structure comprises a socket 3a surrounding a sleeve 4a which in turn surrounds a corresponding portion of rotary shaft 1a.

The outer surface of this sleeve carries a lining 5a of a suitable material having a low coefficient of friction. The outer diameter of this lined or coated sleeve is such that a well-defined reduced clearance exists between the sleeve and the inner wall of socket 3a.

This socket 3a is connected to the fixed wall 2a via a bellows 6a providing a fluid-tight connection or mounting.

The ends of this bellows 6a are secured by welding to a pair of rings 12 and 13, respectively. The first ring 12 tightly engages an annular rib 14 rigid with socket 3a and to this end it is assembled with another ring 16 disposed on the opposite side of this annular rib 14, by means of a set of screws 17. The other ring 13 is secured to the casing wall 2a by means of another set of screws 18.

In this embodiment the means for retaining the socket 3a in the longitudinal direction consist of a system of Hooke's joints.

This system comprises a floating intermediate annular member 19 surrounding the rotary shaft 1a with a considerable clearance. However, this system also comprises two pairs of retaining studs connecting this intermediate annular member 19 with the external socket 3a and the fixed wall 2a, respectively, the retaining studs of these two pairs lying in two axial planes disposed at right angles to each other.

On the other hand, the ends of these studs are pivoted by means of ball-shaped portions to the various members concerned, namely the outer socket 3a, the intermediate annular member 19 and the fixed wall 2a. In fact, the intermediate annular member 19 is connected to ring 12 rigid with socket 3a by means of a pair of studs 20 disposed in the longitudinal direction in an axial plane.

The corresponding ends of these studs 20 are pivoted to the annular member 19 by means of a pair of ball-shaped portions 21 disposed on either side of this annular member and engaging tapered seats formed in the corresponding faces thereof.

The opposite end of these two studs are pivoted in a similar fashion in straps 22 secured to ring 12 by means of screws 13 (see FIG. 5). In fact, the corresponding end of each stud extends through the corresponding strap and carries a pair of ball-shaped elements 24 adapted to pivot or swivel in tapered seats formed in the corresponding faces of this strap.

The intermediate annular member 19 is operatively connected to the fixed wall 2a by means of another pair of retaining studs 20a disposed in an axial plane at right angles to the one containing the aforesaid pair of studs 20.

These other studs 20a are pivoted to the intermediate annular member 19 like said studs 20, i.e. by means of ball-shaped portions 21a disposed on either side of said annular member and pivoted in tapered seats formed in the corresponding faces thereof.

The opposite ends of these two studs are pivoted to a ring 13 secured to the fixed wall 2a. This pivotal mounting is also obtained by means of ball-shaped portions 24a disposed on either side of this ring 13 and adapted to pivot in tapered seats formed in the corresponding faces thereof.

The arrangement described hereinabove constitutes a universal coupling positively capable of retaining the outer socket 3a in the longitudinal direction while permitting its free movement in the radial direction.

In the example illustrated this coupling system retains the socket 3a in both axial directions, since two ball-joints are provided on either side of each member to which each retaining stud is pivoted.

Under these conditions, during the normal operation of the device the socket 3a is retained as it tends to move away from the fixed wall 2a as a consequence of the pressure differential between P1 and P2.

Yet, this arrangement also permits of retaining this socket 3a when it tends to move in the opposite direction, for example when performing tests for determining the fluid tightness of the assembly, by creating a vacuum in chamber P1.

However, it is clear that in case tests of this type were not contemplated it would only be necessary to provide at each pivot joint a single ball-shaped element bearing the corresponding tapered seat.

The device illustrated in FIGS. 2 to 5 inclusive operates in the same manner as the device illustrated in FIG. 1. In fact, when the rotary shaft 1a revolves at its rated speed, a fluid bearing builds up therearound which prevents any direct contact between the outer socket 3a and the sleeve 4a fitted to this shaft.

Besides, when the rotary shaft 1a is started or decelerated before stopping same, the risks of seizing and binding are definitely eliminated due to the presence of the coating or lining 5a of low-friction material provided on the outer surface of sleeve 4a.

The arrangements of the bellows or like connecting sleeve 6a and of the Hooke's joint coupling system connecting the external socket to the fixed casing wall respectively, may be reversed, if desired.

Figure 2:
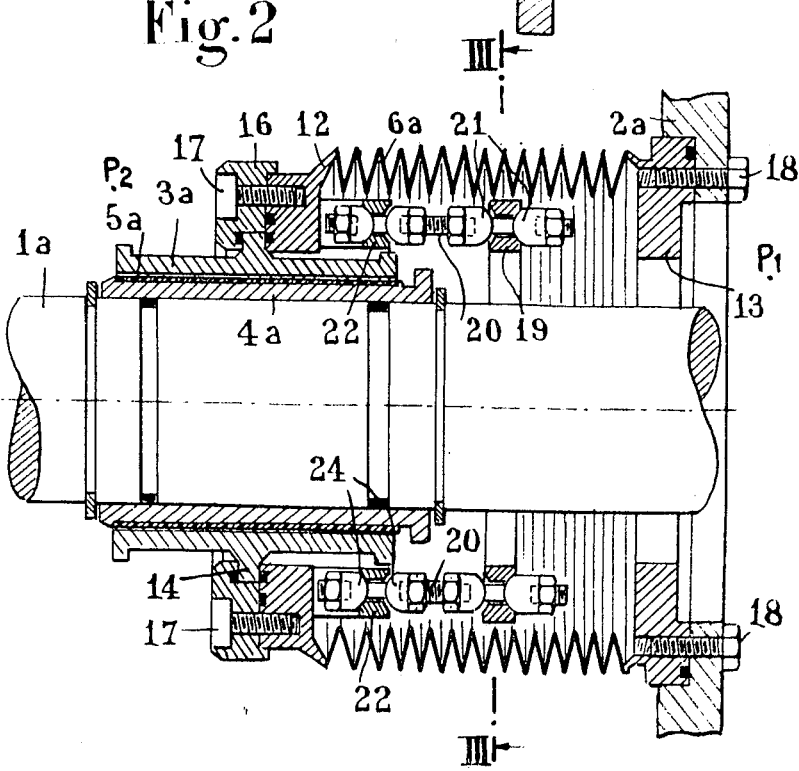
FIG. 2 is an axial sectional view showing another embodiment of the device, the section being taken on a line corresponding to the line II—II of FIG. 1.

In this respect, it may be noted that the arrangement illustrated in FIGS. 2 to 4 inclusive is adequate in case the external atmosphere contains a corrosive fluid. In fact, according to this arrangement the Hooke's joint coupling system is enclosed in the sleeve 6a so that it is efficiently protected against this fluid.

However, in case such fluid were accommodated in the casing from which the rotary shaft 1a projects, it is preferred to adhere to the reverse solution, as illustrated in FIG. 6. This Figure shows a modified form of embodiment with the only difference, in comparison with the preceding one, being that the Hooke's joint coupling system is disposed around the corresponding connecting sleeve 6b.

In this disposition, the intermediate annular member 19b of this coupling system surrounds the sleeve 6b with the retaining studs 20b connecting this annular member to the external socket 3b and the casing wall 2b, respectively.

Since the disposition of the component elements is otherwise identical with the preceding arrangement, it is not necessary to describe it in detail, these component elements being designated in FIG. 6 by the same reference numerals as before to which the suffix "b" is added.

In these various forms of embodiment the sealing device of this invention provides a number of advantageous features of which the main ones are:

a. simplicity of design of the device;

b. constructional simplicity of the device;

c. provision of a very moderate leakage of constant value depending essentially on the socket length and on the radial clearance provided between this socket and the sleeve lining or coating on the rotary shaft. In this respect, it may be noted that this clearance may be reduced considerably in comparison with that of hitherto known devices of this character, due to the provision of a material of low coefficient of friction, which prevents any seizing and binding of the parts when starting rotation of the shaft from rest;

d. elimination of any risk of seizing or binding both when starting the operation and when decelerating the rotary shaft before stopping same;

e. possibility of creating a relatively important pressure differential on either side of the device, so that the latter can be used at will in machines operating under pressure or as well as in vacuo;

f. possibility of introducing a neutral fluid (such as water, nitrogen) in case the fluid contained in the machine or casing is noxious and must positively be prevented from leaking to the exterior, even in very small amounts;

g. absence of regulation in case no neutral fluid is introduced, or in the other alternative, possibility of providing a simple regulation for example by using a pressure-reducing device;

h. the use of materials having a good corrosion resistance and a high resistance to distortion, i. possibility of accommodating a substantial out-of-true condition of the rotary shaft, due to the free play allowed to the external socket which can thus follow the possible displacements of the shaft in the radial direction, due to inherent movements of this shaft; and j. long useful life of the present device, due to its simplicity of design and to the absence of any frictional contact during normal operation.

What I claim is:

1. A sealing device affording a moderate leakage for the passage of a rotary shaft extending through the wall of a casing in which the internal fluid pressure differs from the external pressure, this device comprising in combination a tubular socket surrounding said rotary shaft, the inner surface of said socket having a small annular clearance with respect to the outer surface of said rotary shaft, so that these two surfaces provide therebetween an annular passage permitting a limited fluid flow between said casing and the surrounding atmosphere, a lining of a material having a low coefficient of friction on at least one of the two registering cylindrical surfaces, namely the inner surface of said socket and the outer surface of the corresponding portion of said shaft, a bellows-forming sleeve of flexible material connecting said socket to the wall of said casing through which said rotary shaft extends, and means for retaining said socket in the longitudinal direction, at least in the direction in which it tends to be moved as a consequence of the pressure differential between the internal fluid pressure in said casing and the surrounding external atmosphere, said retaining means being adapted to permit a certain free radial movement of said socket.

2. A sealing device as set forth in claim 1, wherein said means for retaining said socket in the longitudinal direction consist of a Hooke's joint coupling system connecting said socket to the wall of the casing through which said rotary shaft extends.

3. A sealing device as set forth in claim 2, wherein said coupling system connecting said socket to said casing comprise on the one hand a floating annular member surrounding said rotary shaft with a considerable clearance, and on the other hand two pairs of retaining studs connecting said floating annular member to said external socket and said casing respectively, the retaining studs of said two pairs being disposed in two axial planes disposed at right angles to each other, the ends of said studs being pivoted through ball-shaped portions to the members involved, namely said external socket, said floating annular member and said casing through which said rotary shaft extends.

* * * * *